United States Patent Office 2,773,442
Patented Dec. 11, 1956

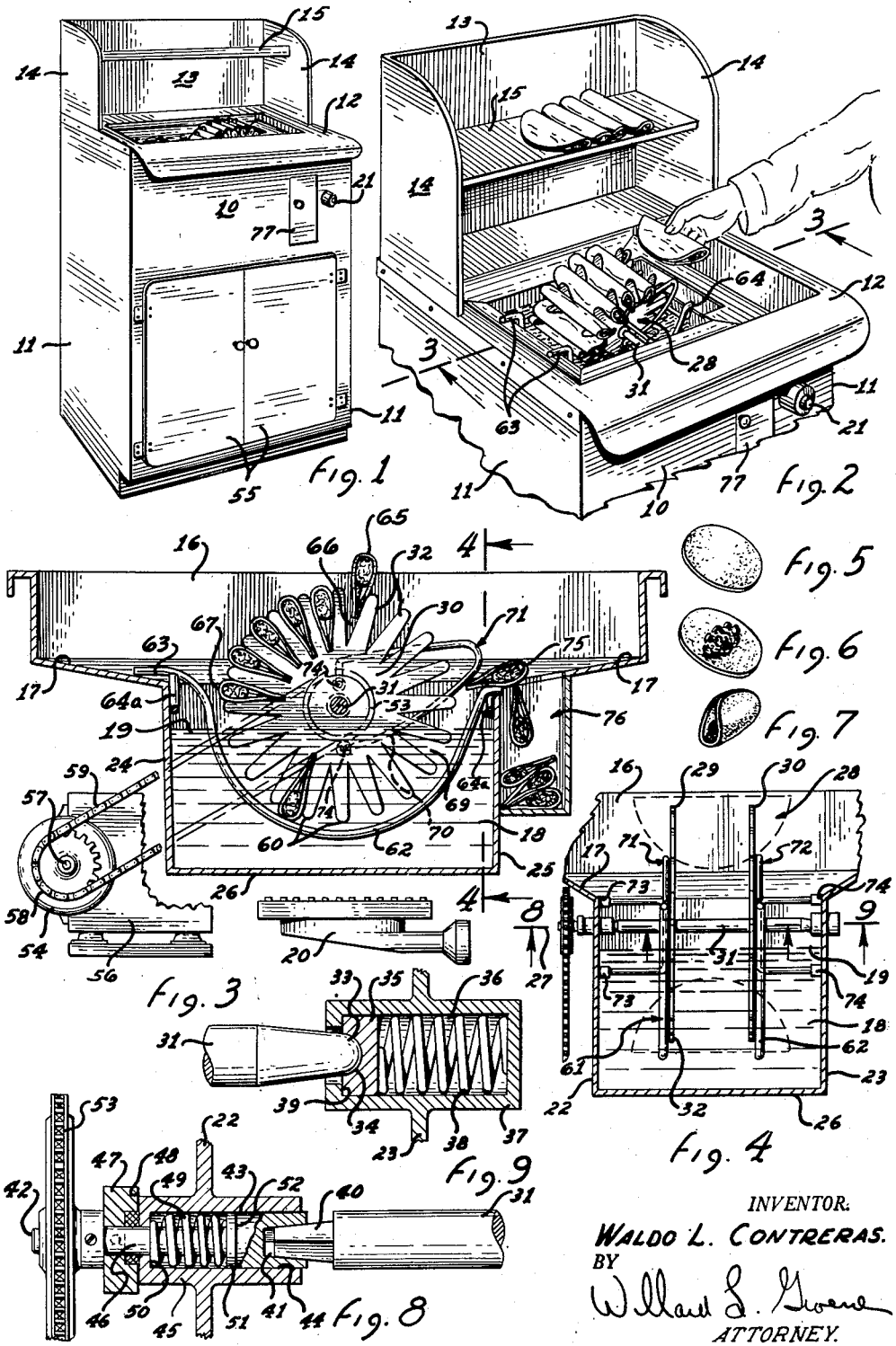

2,773,442

TACO COOKING MACHINE

Waldo L. Contreras, Scottsdale, Ariz.

Application March 15, 1954, Serial No. 416,022

2 Claims. (Cl. 99—404)

This invention pertains to improvements in food cooking devices and is particularly related to an improved taco cooking machine. One of the objects of this invention is to provide an improved taco cooking machine which is extremely simple in design but is highly efficient in operation and production.

Still another object of this invention is to provide an improved taco cooking machine having a minimum of moving and operating parts and which may easily be dissembled for cleaning and sanitary purposes.

Still another object of this invention is to provide a taco cooking machine which may be operated at full capacity for high production of cooked tacos but which is also readily adapted without any modification for the cooking of individual single orders of tacos.

Still another object of this invention is to provide a taco cooking machine having a taco holding wheel and guide device having no moving or operative parts.

Still another object of this invention is to provide a taco cooking machine which affects a circulation of the cooking oil during the cooking operations on the tacos as they are presented into and removed from the cooking oil or deep fat frying solution.

Still another object of this invention is to provide an improved taco cooking machine which may be easily regulated in its productive capacity and degree of cooking affected on the tacos.

Further features and advantages of this invention will appear from a detailed description of the drawings in which:

Fig. 1 is a front perspective view of a taco cooking machine incorporating the features of this invention.

Fig. 2 is an enlarged fragmentary perspective view of the cooking area of the machine shown in Fig. 1.

Fig. 3 is a section on the line 3—3 of Fig. 2.

Fig. 4 is a section on the line 4—4 of Fig. 3.

Fig. 5 is a perspective view of a taco pancake.

Fig. 6 is the pancake of Fig. 5 after receiving the taco filling.

Fig. 7 is the taco of Fig. 6 folded ready for cooking.

Fig. 8 is an enlarged fragmentary section on the line 8—8 of Fig. 4.

Fig. 9 is an enlarged section on the line 9—9 of Fig. 4.

As illustrative of one embodiment of this invention there is shown a taco cooking machine having a front 10 and sides 11 and a top 12. A suitable back 13 having the side wings 14 and the shelf 15 may preferably be provided at the rear of the top 12.

In the top 12 is a recessed cooking area indicated at 16 terminating at its bottom in the ledge 17 which slopes inwardly toward the cooking oil containing chamber 18. Cooking oil is contained in the chamber 18 at approximately the liquid level 19, the chamber being heated by a suitable source of heat such as a gas burner 20 controlled by the usual thermostatic control apparatus which may be regulated to the desired temperature by the control knob 21 on the front 10 of the cabinet. The cooking oil chamber 18 is formed by the front plate 22, the rear plate 23, the end plates 24 and 25 and the bottom plate 26, the front and rear plates and end plates being welded or soldered at their upper edges to the inner edge of the ledge 17 to form the depressed receptacle providing the cooking oil chamber 18.

Arranged to rotate on an axis 27 immediately above the liquid level 19 is the taco carrying wheel indicated generally at 28 which comprises a pair of axially spaced discs 29 and 30 rigidly fixed in axially spaced position on the taco wheel shaft 31. The outer periphery of the discs 29 and 30 have a series of integral taco supporting fingers 32. The shaft 31 is provided with a bearing end 33, Fig. 9, which is journaled in the socket portion 34 of the bearing block 35 slidably mounted in the bore 36 of the bearing support bushing 37 rigidly fixed to the rear wall 23 of the cooking oil chamber 18 of the machine. A compression spring 38 normally holds the bearing block 35 up against the shoulder 39 formed in the outer end of the bearing support bushing 37.

The other end of the shaft 31 is formed with a squared end 40 which fits in a mating socket 41 of the drive shaft 42 which has an enlarged portion 43 journaled in the bore 44 of the front bearing support bushing 45. The shaft 42 has a reduced outer end portion 46 upon which is fixed the sealing collar 47 which abuts against the outer face 48 of the front bearing support bushing 45 to form a liquid-tight seal. A compression spring 49 acting against the shoulder 50 of the bushing 45 and against the thrust washer 51 engaging the shoulder 52 of the shaft 42 serve to maintain the running seal at 48 on the bushing 45. On the outer reduced end 46 of the drive shaft 42 is fixed the driving sprocket 53.

A suitable drive motor 54 is suitably mounted behind the doors 55 in the bottom of the cabinet shown in Fig. 1, the motor 54 preferably being provided with a suitable reduction unit 56 so that a slow speed output from its output shaft 57 is provided for the output sprocket 58 connected through a suitable chain 59 to the sprocket 53.

Around the lower periphery 60 of the taco carrying wheel fingers 32 are the semi-circular taco guide members 61 and 62 which terminate in their upper ends in outwardly extending diametrically disposed support ends 63 and 64 which rest upon the top of the ledge 17 as best shown in Figs. 2 and 3. A suitable downwardly extending positioning rod 64 properly positions the taco guide members 61 and 62 adjacent the support end 63 with regard to the axis of rotation 27 of the taco carrying wheel 28 while direct engagement of the portion 64a with inside of the side plate 25 positions guide members 61 and 62 in the opposite direction.

In the operation of the taco cooking machine the heating member or gas burner 20 is ignited to bring the cooking oil in the cooking oil chamber 18 to proper cooking temperature which, for example, may be in the range of 365 degrees to 385 degrees Fahrenheit. Upon occasion the oil may rise or change level 19 due to both the temperature rise of the liquid and also due to the displacement caused by the feeding of tacos into the machine. Hence the purpose of the complete seal arrangement as shown in Figs. 8 and 9 should the oil get above the shaft 31 and even up on to the ledge 17 of the machine, no harm occurring under these circumstances.

With the liquid in the cooking oil chamber 18 at the proper operating temperature, tacos are then made up as shown in Figs. 5, 6 and 7 in the usual manner and inserted at the point 65 in the V-shaped notches 66 formed by the fingers 32 of the taco carrying wheel 28 as the wheel is rotated slowly at a suitable cooking speed such as between 1 to 2 R. P. M. by the drive motor 54. As the taco swings around with the wheel to the horizontal position with the tacos placed preferably with the open end projecting toward the center of rotation of the wheel, the folded over outer portion 67 of the taco engages the concave edges of the taco guide members 61 and 62 and then enters into the cooking oil in the chamber 18 and passes on around down through and up the other side to the position 69 where it emerges from the cooking oil solution. At this point the taco is engaged by the outwardly sloping surface 70 of the automatic unloading devices 71 and 72 comprising the looped members having end portions demountably supported in suitable sockets 73 and 74 secured to the sides 22 and 23. Continued rotation of the wheel 28 causes the surface 70 to eject the cooked taco from the V-shaped notches 66 between the fingers 32 so that as the taco reaches the position 75 it will drop into the warming receiver 76 from which the taco may be removed through the door 77 in the front of the cabinet for serving. One taco can be placed in the wheel at a time or the wheel can be continuously loaded at the point 65 and unloaded at the point 75 into the warming receiver 76 for the full production capacity of the machine.

It will also be noted that the device is easily dissembled for cleaning. All that is required is to remove the unloader devices 71 and 72 and to remove the taco carrying wheel 28 by gripping in the hand and pushing to the right in Figs. 4, 8 and 9 compressing the spring 38 so as to allow the squared end 40 to be drawn out from its socket connection 41 with the drive shaft 42 and the entire assembly lifted out from the cooking oil chamber 18. The guide frame comprising the members 61 and 62 may thus be lifted from the device for easy cleaning and servicing.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendent claims are intended to be included herein.

Having thus fully set forth and described this invention what is claimed and desired to be obtained by United States Letters Patent is:

1. A taco cooking machine a work holding wheel having a horizontally journaled shaft, a pair of axially spaced thin work holding discs fixed at right angles to said shaft, work supporting fingers formed on said discs by cutaway radially disposed V-shaped notches having outwardly divergent work engaging edges on said fingers lying in planes parallel to the axis of rotation of said wheel, said edges providing the sole means for wedgingly engaging and supporting the tacos on said wheel, a semicircular guide member adjacent the periphery of the lower half of said wheel, and upwardly and outwardly sloping unloading devices between the axis of rotation of said wheel and said guide member to automatically remove tacos from said work holding wheel during the rotation thereof.

2. In a taco cooking machine having a cooking oil chamber, a taco carrying wheel, means for rotatably supporting said wheel for rotation about a horizontal axis directly above a cooking oil level of said cooking oil chamber, a series of radially disposed fingers forming V-shaped notches defined by outwardly divergent work engaging edges on said fingers lying in planes parallel to the axis of rotation of said wheel and adapted to receive tacos therein, semi-circular guide members adjacent to the lower half of the periphery of the outer ends of the fingers of said wheel located below the cooking oil level of said cooking oil chamber adapted to engage the folded portion of and hold said tacos on said edges of said V-shaped notches during the rotation of said wheel, unloading devices on each side of said wheel having outwardly and upwardly sloping surfaces positioned relative to the axis of rotation of said wheel extending above the cooking oil level of said cooking oil chamber adapted to engage the edges of the open end of the tacos, and a warming receiver adjacent said cooking oil chamber adapted to receive tacos discharged from said wheel by said unloading devices.

References Cited in the file of this patent
UNITED STATES PATENTS

| Number | Name | Date |
|---|---|---|
| 687,776 | Pain | Dec. 3, 1901 |
| 774,826 | Butler | Nov. 15, 1904 |
| 1,432,578 | Thomas et al. | Oct. 17, 1922 |
| 1,720,525 | Potthoff | July 9, 1929 |
| 2,240,989 | Hood et al. | May 6, 1941 |
| 2,259,278 | Theiss | Oct. 14, 1941 |
| 2,355,249 | Szabo | Aug. 8, 1944 |
| 2,552,621 | Clay | May 15, 1951 |
| 2,558,455 | Novak | June 26, 1951 |